Jan. 31, 1967 W. J. FRANKLIN ET AL 3,300,847
PORTABLE ALIGNMENT TOOL

Filed March 30, 1964 3 Sheets-Sheet 1

WILLIAM J. FRANKLIN,
NEIL C. MARTIN,
INVENTORS

BY
*G. D. O'Brien*
*James O. Harrell*

ATTORNEYS

WILLIAM J. FRANKLIN,
NEIL C. MARTIN,
INVENTORS

WILLIAM J. FRANKLIN,
NEIL C. MARTIN,
INVENTORS

ATTORNEYS

United States Patent Office

3,300,847
Patented Jan. 31, 1967

3,300,847
PORTABLE ALIGNMENT TOOL
William J. Franklin and Neil C. Martin, Huntsville, Ala., assignors to the United States of America as represented by the Administrator of the National Aeronautics and Space Administration
Filed Mar. 30, 1964, Ser. No. 356,692
3 Claims. (Cl. 29—271)

The invention described herein may be manufactured and used by or for the Government of the United States of America for governmental purposes without the payment of any royalties thereon or therefor.

The present invention relates generally to means for aligning wall or sheet sections and more particularly to a portable alignment tool adapted to urge the surfaces of two adjacent wall or sheet sections into flush alignment so that the sections may be secured together at their point of junction.

It has become a common practice to fabricate large structures by securing several wall or sheet sections together with welds, rivets, etc. For instance, in the present space age, large metal tank sections are being used to fabricate rocket boosters which have the capacity to travel to the moon. Because of the extreme pressures and forces exerted on these rocket boosters as they travel through the earth's atmosphere, it has become essential that the tank sections be secured together with very high quality welds or other securing means in order to prevent a catastrophic flight failure. Such high quality welds, for example, can only be obtained with modern welding equipment and techniques where the surfaces of the adjacent tank sections are held in as near perfect alignment as possible during the fabricating operation. Thus, the need to advance the alignment fixture art cannot be overlooked where one is striving for perfection in the fabrication of huge structures from a plurality of wall or sheet sections.

Various types of jig fixtures and tools are available for holding wall or sheet sections in alignment so that the sections may be secured together by welding, riveting, etc. As an example, one of the most common types of fixture which has been used in the past to fabricate a tank from a plurality of cylindrical sections is what is often termed a "spider" structure. This "spider" structure is assembled inside of the cylindrical tank sections and, in general, consists of a central support having radially extending "spider" arms for carrying actuators which force a segmented back-up bar element tightly against the inner surfaces of the adjacent cylindrical tank sections. With the segmented back-up bar element so forced against the tank sections, the surfaces thereof are maintained in proper alignment while the tank sections are being secured together.

Although, in general, the above mentioned prior fixtures are adequate for aligning wall or sheet sections which are relatively small, they have not been found to be suitable where the wall or sheet sections are quite large in size and highly flexible, particularly those used to fabricate rocket booster tanks which exceed 10 feet in diameter. For instance, it would be totally impractical to attempt to utilize the so-called "spider" structure for aligning large tank sections since such structure would consequently have to be so large, complex and bulky that the cost involved would render the entire fabricating operation infeasible. Many problems would also be encountered in providing the "spider" structure with means for supporting and forcing an extremely large and heavy back-up bar element against the surfaces of the tank sections in such a manner as to give the alignment needed to accomplish the fabricating operation. Due to the fact that the thin, large tank sections are highly flexible, it would also be difficult to obtain the proper alignment with the "spider" structure since the back-up bar element contacts only the inner surfaces of the tank sections. To those having experience in fabricating large structures from sheet sections, the use of prior types of fixtures for aligning the various sheet sections presents many other difficulties and disadvantages, for example, as taking up vitally needed floor space and requiring too much time and manpower to complete the fabricating operation.

In accordance with the present invention, it has been found that the foregoing difficulties and disadvantages presented by the prior alignment fixtures discussed above may be overcome by providing a unique, portable alignment tool which can be used successfully in aligning wall or sheet sections so that the same may be secured together properly and in an efficient manner. This portable alignment tool consists, in general, of three main parts; (1) a first clamping element adapted to contact the surfaces of two adjacent wall or sheet sections on one side thereof, (2) a second clamping element adapted to contact the opposite surfaces of the two wall or sheet sections on the other side thereof, and (3) a thin, flexible band extending between the clamping elements and through the joint formed by the opposed, contiguous edges of the two adjacent wall or sheet sections. The thin, flexible band is connected to each of the clamping elements and the slack therein may be taken up by an actuator, such as, for example, a mechanical screw mounted on one of the clamping elements. As the slack in the thin, flexible band is being taken up by the actuator, the clamping elements are urged into clamping engagement against the two adjacent wall or sheet sections and ultimately the surfaces thereof are forced into as well as maintained in flush alignment. After the wall or sheet sections are secured together, the alignment tool may be readily released from clamping engagement with the sections by cutting the thin, flexible band with a knife blade mounted on one of the clamping elements.

Accordingly, it is an object of the present invention to provide a universal clamping tool which is especially useful in aligning both large and small wall or sheet sections.

It is also an object of this invention to provide a clamping tool which is portable and easy to operate and handle.

Another object of the present invention is to provide a clamping tool consisting of a simple construction which results in a saving of time, weight and cost.

A further object of this invention is to provide a clamping tool which can be used to quickly align two adjacent wall or sheet sections and is easily released from clamping engagement with the sections.

Other objects and advantages of this invention will become more apparent from a reading of the following detailed description and appended claims taken in conjunction with the accompanying drawings wherein:

For a better understanding of the construction and use of this invention, the novel alignment tool will be described specifically in connection with the alignment of large, cylindrical tank sections to be secured together by welding, riveting, etc. However, it is to be understood that the use of this clamping tool is not limited to the alignment of only cylindrical tank sections but may obviously be used to align any kind of wall or sheet sections, such as flat, corrugated, elliptical, etc.

Figure 1:
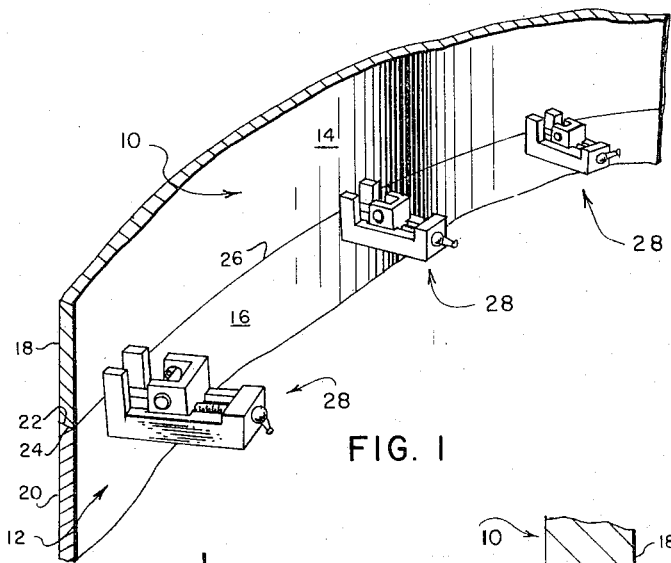
FIGURE 1 is a perspective view showing partial cylindrical tank sections employing the portable alignment tool.

Referring now in more detail to the drawings wherein like reference numerals designate identical or corresponding parts throughout the several views, and with special attention to FIGURE 1, reference numerals 10 and 12 generally designate upper and lower cylindrical tank sections, respectively, which the present invention is used in conjunction therewith. The upper and lower tank sections 10 and 12 have inner surfaces 14 and 16, respectively, and outer surfaces 18 and 20, respectively. A bottom edge 22 of the upper tank section 10 and an upper edge 24 of the lower tank section 12 are positioned in an opposed, contiguous relationship to form a joint designated generally to be reference numeral 26.

The present invention, in essence, consists of a pair of clamping elements, designated generally by reference numerals 28 and 30, located adjacent the joint 26 in clamping positions against the respective inner surfaces 14 and 16 and outer surfaces 18 and 20 of the upper and lower tank sections 10 and 12. Any number of clamping elements 28 and 30 may be positioned along the joint 26 at spaced intervals. The clamping elements may be constructed of non-magnetic materials to prevent any interference with the operation of weld seam-tracking or other similar electronic equipment.

Figure 2:
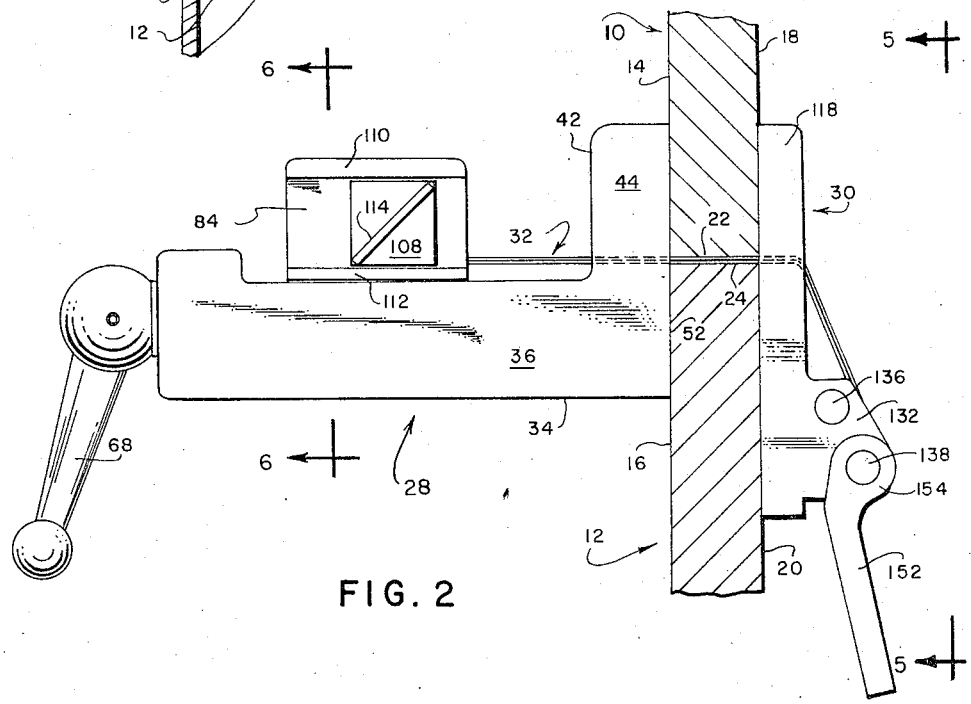
FIGURE 2 is a side elevational view showing the portable alignment tool in its clamping position.
Figure 3:
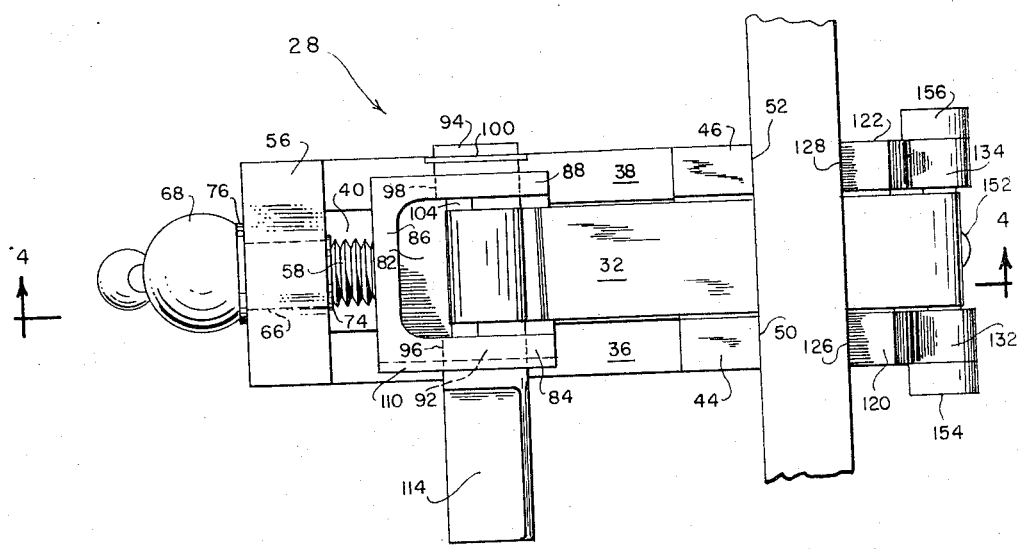
FIGURE 3 is a plane view of the portable alignment tool.

As is shown in FIGURES 2 and 3, a thin metallic band, designated generally by reference numeral 32, is connected between the clamping elements 28 and 30 and extended through the joint 26 for drawing the clamping elements 28 and 30 into contact with the inner surfaces 14 and 16 and outer surfaces 18 and 20. The thin band 32 and its relationship with the clamping elements 28 and 30 will be described more fully hereinafter. The clamping element 28 consists of a bracket 34 having a pair of side elements 36 and 38 spaced apart to form a recess 40. The inner end of the bracket 34 is in the form of a U-shaped clamping member 42. The U-shaped clamping member 42 is constructed of legs 44 and 46 connected by a cross member 48 formed integral with the side elements 36 and 38. The legs 44 and 46 present vertical faces 50 and 52, respectively, which contact the inner surface 14 of the upper tank section 10. The cross element 48 has a vertical face 54 which engages the inner surface 16 of the lower tank section 12. A cross member 56 is integrally formed with the side elements 36 and 38 at the outer end of the bracket 34.

Figure 4:
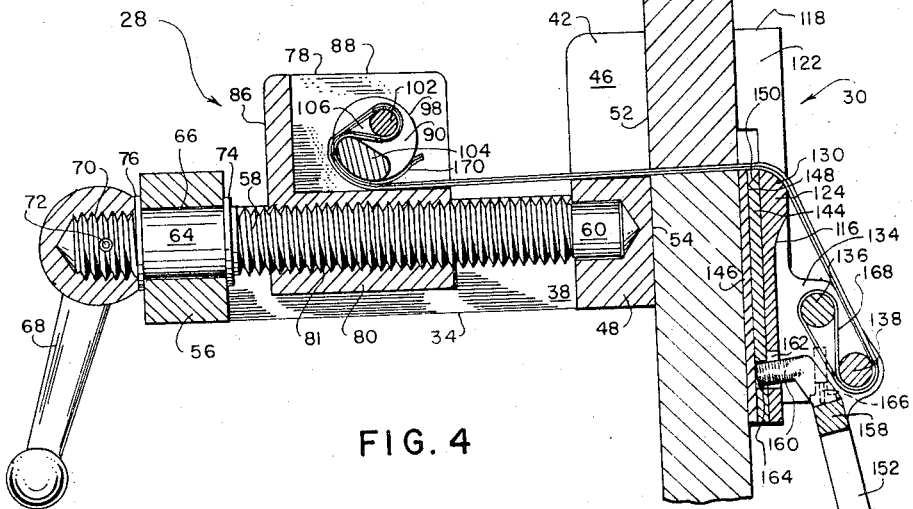
FIGURE 4 is a cross sectional view taken along a plane indicated by line 4—4 in FIGURE 3.

As shown more clearly in FIGURE 4, a screw 58 is positioned in the recess 40 and journalled in the cross members 48 and 56. The screw 58 has an inner end portion 60 received in a recess 62 formed in the cross member 48 and an intermediate portion 64 journalled in an opening 66 extending through the cross member 56. A threaded hand lever 68 is mounted on a threaded portion 70 of the screw 58 adjacent the outer end thereof and is locked in place by a set screw 72. A removable retaining ring 74 and washer 76 are mounted on the screw 58 adjacent the respective sides of the cross member 56 to prevent the intermediate portion 64 of the screw 58 from sliding longitudinally in the opening 66. As can be readily seen, the screw 58 may be disassembled from the bracket 34 by loosening the set screw 72, removing the the bracket 34 by loosening the set screw 72, removing the retaining ring 74 and withdrawing the screw 58 through the opening 66.

Figure 6:
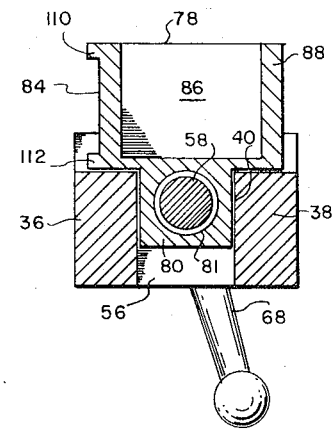
FIGURE 6 is a cross sectional view taken along a plane indicated by line 6—6 in FIGURE 2.

A movable block 78 is positioned on top of the side elements 36 and 38 of the bracket 34 and has a threaded bottom portion 80 extending into the recess 40. In FIGURE 6, the screw 58 is shown extending through a threaded aperture 81 in the bottom portion 80 and serves to move the movable block 78 back and forth in a longitudinal direction along the side elements 36 and 38. The upper portion of the block 78 forms a housing 82 consisting of wall members 84, 86, and 88. A retaining element 90 is rotatably mounted within the housing 82 and is constructed of end portions 92 and 94 which are rotatably and slidably received in openings 96 and 98. A snap ring 100 is removably mounted on the end portion 94 and adapted to serve as a stop means to normally prevent withdrawal of the retainer element 90 from the block 78.

The retainer element 90 is further composed of a dowel pin 102 and retaining shaft 104 extending between the end portions 92 and 94. The dowel pin 102 and retaining shaft 104 are spaced apart to form an eye 106. A square plate 108 is rigidly connected to the end portion 92 and is normally positioned between flanges 110 and 112 to form a positive locking means for locking the retainer element 90 in any one of four different positions. The end portions 92 and 94 are adapted to slide within the openings 96 and 98 so as to permit the square plate 108 to clear the flanges 110 and 112. Whenever the square plate 108 is cleared of the flanges 110 and 112, the retainer element 90 may be rotated freely by a thumb lever 114 fixedly connected to the outer side of the square plate 108. While only one type of locking means for the retainer element 90 has been described, it is apparent that any number of different kinds may be employed.

Figure 5:
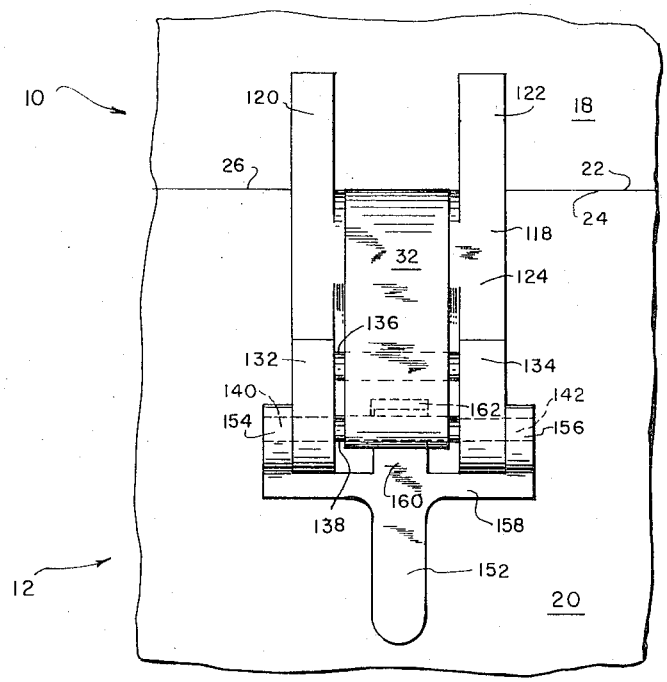
FIGURE 5 is a rear elevational view taken along a plane indicated by line 5—5 in FIGURE 2.

In FIGURES 4 and 5, the clamping element 30 is shown consisting of a bracket 116 having the upper end thereof in the form of a U-shaped clamping member 118. The U-shaped clamping member 118 consists of legs 120 and 122 and a cross member 124. The legs 120 and 122 present vertical faces 126 and 128 which engage the outer surface 18 of the upper tank section 10. The cross member 124 is rounded at 130 and serves as a guide means for the flexible band 32. Located adjacent the lower end of the bracket 116 is a pair of spaced apart flanges 132 and 134 with retaining pins 136 and 138 extending therebetween. The retaining pin 138 has ends 140 and 142 projecting outward beyond the flanges 132 and 134.

A replaceable blade 144 is positioned between the inner face of the bracket 116 and a removable retaining plate 146. An inner face 148 of the retaining plate 146 engages the outer surface 20 as the lower tank section 12. The removable retaining plate 146 may be attached to the bracket 116 in any convenient manner, such as, for example, by bolts, screws, etc. The upper cutting edge 150 of the blade 144 is tapered so as to permit the flexible band 32 to be cut gradually from one side to the other. The blade 144 is actuated by a lever 152 which consists of bifurcated portions 154 and 156 pivotally connected to the respective ends 140 and 142 of the retaining pin 138 and a crosspiece 158. A fulcrum 160 is connected to the central portion of the cross piece 158 and extends through a slot 162 in the bracket 116 and into an oversized opening 164 in the blade 144. The blade 144 is normally retained in its retracted position by a spring-loaded pin 166 slidably mounted in the bracket 116 and engaging the crosspiece 158 of the lever 152.

As mentioned hereinbefore, the thin, flexible band 32, as shown in FIGURE 4, extends through the joint 26 and connects the clamping elements 28 and 30. If desired, the bottom edge 22 and upper edge 24 of the upper and lower tank sections 10 and 12, respectively, may be recessed slightly to permit the flexible band 32 to be extended readily through the joint 26. However, such recessing is not normally needed since a small gap is usually left between the upper and lower tank sections 10 and 12 due to their misfit. The flexible band is anchored to the clamping element 30 by having an intermediate portion 168 wrapped around the retaining pins 136 and 138 in the manner shown in FIGURE 4. The flexible band 32 is folded and positioned in the U-shaped clamping element 42 and 118 which also serve as guiding or retaining means to prevent the flexible band 32 from moving laterally. The bottom layer of the flexible band rests on the cross members 48 and 124 of the U-shaped clamping elements 42 and 118, respectively. The flexible band 32 is anchored to the clamping element 28 by having the free end portions 170 wrapped around the dowel pin 102 and retaining shaft 104 in the manner shown in FIGURE 4.

The operation of the present invention will now be summarized. To fabricate a tank, the upper tank section 10 is positioned on top of the lower tank section 12 in any convenient manner so that they may be secured together by welding, riveting, etc., along the joint 26. To assemble the clamping tool 28 for aligning the inner surfaces 14 and 16 and outer surfaces 18 and 20 of the upper and lower tank sections 10 and 12, one end of the flexible band 32 is threaded through and around the retaining pins 136 and 138 of the clamping element 30 until the free end portions 170 of the flexible band 32 are equally distributed. The flexible band 32 is then folded to form a double layer and the free end portions 170 are extended through the U-shaped clamping member 118, the joint 26 and the U-shaped clamping member 42 of the clamping element 28. It is considered to be more convenient to position the clamping element 30 in contact with the outer surfaces 18 and 20 of the upper and lower tank sections 10 and 12 since the lever 152 could be actuated by a person on the outside of the tank, but it may obviously be positioned on the inner surfaces 14 and 16, if desired.

With the block 78 located in an inner position adjacent the U-shaped clamping member 42, the free end portions 170 of the flexible band 32 are threaded through the eye 106 formed by the spacing between the dowel pin 102 and the retaining shaft 104 until several inches of the band 32 are left free. The retaining element 90 is then moved laterally to clear the square plate 108 from the flanges 110 and 112 and rotated 360 degrees by the thumb lever 114 to wind the free end portions 170 of the band 32 around the dowel pin 102 and retaining shaft 104 thereby causing the free end portions 170 to be clamped in place on the retaining element 90. To lock the retaining element 90 against rotation, it is moved laterally to a position whereby the square plate 108 is located between the flanges 110 and 112. Whenever the flexible band 32 is constructed of metal, it acts as a torsion spring after the free end portions 170 are wound around the dowel pin 102 and retaining shaft 104 thereby preventing the retaining element 90 from freely moving laterally to its unlocked position.

After the retaining element 90 is locked in place, the screw 56 is rotated by the hand lever 68 to move the block 78 outwardly away from the U-shaped clamping member 42. As the block 78 is so moved, the slack in the flexible band 32 is taken up; thereby causing the clamping elements 28 and 30 to force the upper and lower tank sections 10 and 12 into alignment with each other. To provide equally distributed forces on the upper and lower tank sections along the joint 26, any number of clamping tools may be used and the flexible bands thereof tighten uniformly by applying a standard torque wrench to the hand levers for actuating the screws. However, a unique feature of this alignment tool is that it can be used readily without utilizing additional wrenches or tools.

To remove a particular clamping tool from the upper and lower tank sections 10 and 12, it is necessary to only strike the lever 152 with a light impact stroke to cause the blade edge 150 to shear the flexible band 32 and thus permitting the clamping elements 28 and 30 to fall away from the joint 26. This quick release feature is very important whenever a number of clamping tools must be used to properly align the wall or sheet sections, such as is the case when the upper and lower tank sections 10 and 12 are to be secured together by welding, since it permits each clamping tool to be removed immediately ahead of the welding machine as it moves along the joint 26. If desired, a particular clamping tool may be used recurrently on the same tank sections so as to save on the number of clamping tools required to complete the fabricating operation.

Obviously numerous modifications and variations of the present invention are possible in the light of the above teachings. It is therefore to be understood that within the scope of the appended claims, the invention may be practiced otherwise than as specifically described and illustrated.

What is claimed is:

1. A tool for alignment of wall sections comprising:
   (a) a first clamping element having an end surface adapted to contact the face surfaces of one side of two adjacent wall sections;
   (b) said first clamping element including a pair of side elements spaced apart and joined at each end with a cross member so as to define a recess;
   (c) an elongated screw positioned within said recess and journaled within said cross members;
   (d) means for rotating said screw;
   (e) a movable block positioned above said side members and having a bottom portion extending within said recess;
   (f) said elongated screw being threaded through the bottom portion of said movable block whereby rotation of said screw will cause the movable block to move along the axis of said screw;
   (g) a second clamping element being defined by a body portion with two upper legs having a substantially side planar surface adapted to contact the face surfaces of the two adjacent wall sections opposite the face surfaces contacted by said first clamping element;
   (h) said body portion of said second clamping element having two flanges projecting outwardly from the side opposite the planar surface;
   (i) a lever pivotally connected between said two flanges;
   (j) said body portion having a blade adapted to slide form said body portion into the space between said two upper legs;
   (k) said lever having means for engaging said blade and causing it to slide between said two upper legs;
   (l) a thin metallic band extending between said first and second clamping elements and adapted to extend through the joint formed by the two adjacent wall sections;
   (m) said movable block of said first clamping means having a retainer for holding one end of said metallic band;
   (n) said body portion of said second clamping element having a retainer for holding the other end of said metallic band; and
   (o) said metallic band passing between said upper legs of said second clamping element so that when said lever means is activated the blade will sever said metallic band.

2. A tool as defined by claim 1 wherein:
said retainer of said movable block includes a rotatable element about which said metallic band is adapted to be wound and a means for locking the rotatable element.

3. A tool for alignment of wall sections, comprising:
   (a) a first clamping element defined by a horizontally arranged body portion having at one end two perpendicular vertical legs so as to form an end surface adapted to contact the face surfaces of one side of two adjacent wall sections to be aligned;
   (b) a retainer block adapted to move axially along said horizontal body portion;
   (c) means for moving said retainer block axially along said horizontal body portion;
   (d) a second clamping element defined by a vertically arranged body portion with two upper legs forming a side surface adapted to contact the face surfaces of the other side of two adjacent wall sections contacted by said first clamping element;

(e) said body portion of said second clamping element having a blade slidably mounted within said body portion and adapted to slide out between said two upper legs;

(f) means for causing said blade to slide between said two upper legs;

(g) a flexible band extending between said first and second clamping elements and adapted to extend through the joint formed by the two adjacent wall sections;

(h) said retainer block of said first clamping means having a rotatable means for holding one end of said flexible band and for winding up a certain length of the flexible band;

(i) said flexible band passing between said two vertical legs of said first clamping means;

(j) said body portion of said second clamping element having a retainer for holding the other end of said flexible band; and (k) said flexible band passing between said upper legs of said second clamping element so that said blade may be caused to slide between the legs and sever the flexible band to enable the tool to be rapidly removed from the two adjacent wall sections.

References Cited by the Examiner

UNITED STATES PATENTS

| | | | |
|---|---|---|---|
| 954,886 | 4/1910 | Rolston | 140—123.6 |
| 1,271,564 | 7/1918 | Gordon | 254—77 |
| 1,440,627 | 1/1923 | Rasmussen | 254—67 |
| 1,751,823 | 3/1930 | Lampert | 254—29 |
| 3,083,742 | 4/1963 | Orme | 140—93.2 |
| 3,120,946 | 2/1964 | McCormack | 254—79 |
| 3,129,728 | 4/1964 | Sharko | 140—123.6 |

FOREIGN PATENTS

| | | |
|---|---|---|
| 658,455 | 1/1929 | France. |
| 1,166,311 | 6/1958 | France. |

HAROLD D. WHITEHEAD, *Primary Examiner.*